United States Patent
Hochstetler et al.

(10) Patent No.: US 10,436,251 B2
(45) Date of Patent: Oct. 8, 2019

(54) FIXED BLOCK SHAFT INNER BEARING RACE FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/868,278

(22) Filed: Jan. 11, 2018

(65) Prior Publication Data
US 2019/0211871 A1    Jul. 11, 2019

(51) Int. Cl.
| | | |
|---|---|---|
| *F16C 33/58* | (2006.01) | |
| *F16C 3/02* | (2006.01) | |
| *F16C 19/26* | (2006.01) | |
| *H02K 7/08* | (2006.01) | |
| *F16H 47/04* | (2006.01) | |
| *H02K 7/10* | (2006.01) | |
| *H02K 15/00* | (2006.01) | |

(52) U.S. Cl.
CPC .............. *F16C 33/585* (2013.01); *F16C 3/02* (2013.01); *F16C 19/26* (2013.01); *F16H 47/04* (2013.01); *H02K 7/085* (2013.01); *H02K 7/10* (2013.01); *H02K 15/0006* (2013.01); *H02K 2213/03* (2013.01)

(58) Field of Classification Search
CPC .... F16C 2240/70; F16C 33/585; F16C 19/26; F16C 33/58
See application file for complete search history.

(56) References Cited

U.S. PATENT DOCUMENTS

| 4,990,807 A | 2/1991 | Flygare et al. |
|---|---|---|
| 6,315,458 B1 * | 11/2001 | Unno ............... F16C 19/26 384/565 |

(Continued)

FOREIGN PATENT DOCUMENTS

EP    3023616 A1    5/2016

OTHER PUBLICATIONS

European Search Report for EP Application No. 19151419.9 dated Jun. 21, 2019.

*Primary Examiner* — Thomas R Hannon
(74) *Attorney, Agent, or Firm* — Carlson, Gaskey & Olds, P.C.

(57) ABSTRACT

An inner bearing race has a body extending from a first end to a second end. An inner bearing race surface defined between a pair of lands extends radially outwardly of the inner bearing race surface, with one of the lands extending to the second end. The bearing race surface is defined by inner face surfaces of the lands. The inner bearing race surface extends for an axial distance between the inner facing surfaces along a central axis C of the body and defines a first distance. A second distance defines an outer diameter of the inner bearing race surface is defined as a second distance and a ratio of the first distance to the second distance being between 0.20 and 0.30. An integrated drive generator and a method are also disclosed.

20 Claims, 3 Drawing Sheets

(56) References Cited

U.S. PATENT DOCUMENTS 6,988,833 B1 * 1/2006 Docimo .................. F16C 19/26
384/572
7,066,654 B2 * 6/2006 Wang ...................... F16C 19/26
384/553

* cited by examiner

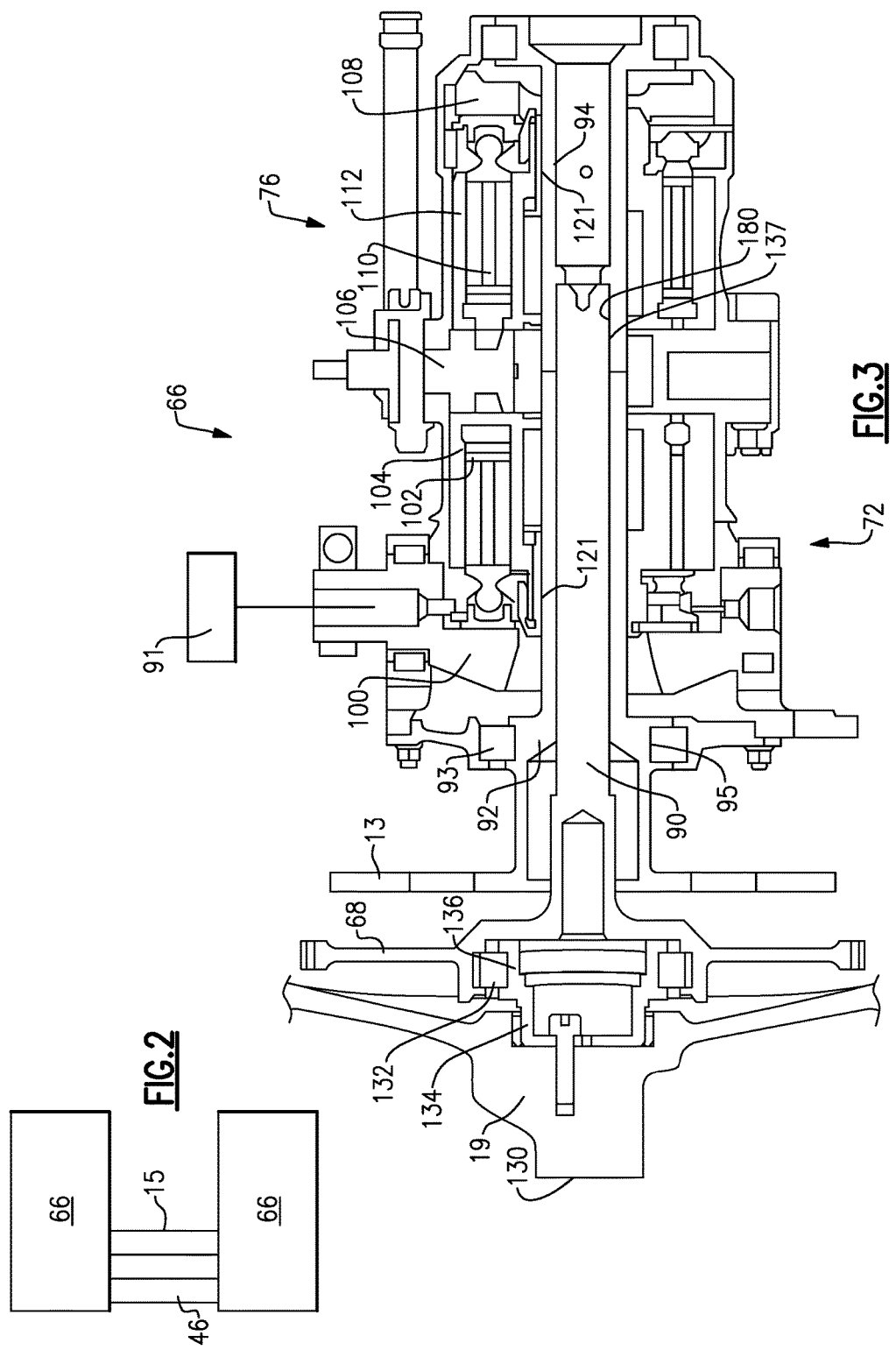

FIXED BLOCK SHAFT INNER BEARING RACE FOR INTEGRATED DRIVE GENERATOR

BACKGROUND

This application relates to an inner bearing race for a fixed block shaft in a hydraulic unit of an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the output ring gear of the differential through an accessory drive gear.

A fixed block shaft in the hydraulic unit is supported on a bearing and an inner bearing race for this bearing raises design challenges.

SUMMARY

An inner bearing race for use in an integrated drive generator has a body extending from a first end to a second end. An inner bearing race surface defined between a pair of lands extends radially outwardly of the inner bearing race surface, with one of the lands extending to the second end. The bearing race surface is defined by inner face surfaces of the lands. The inner bearing race surface extends for an axial distance between the inner facing surfaces along a central axis of the body and defines a first distance. An outer diameter of the inner bearing race surface is defined as a second distance and a ratio of the first distance to the second distance being between 0.20 and 0.25.

In addition, an integrated drive generator and a method of replacing an inner bearing race from an integrated drive generator are disclosed.

These and other features may be best understood from the following drawings and specification.

BRIEF DESCRIPTION OF THE DRAWINGS

FIG. 2 schematically shows hydraulic units in the integrated drive generator.
FIG. 3 shows the components of a hydraulic unit.

DETAILED DESCRIPTION

Figure 1:
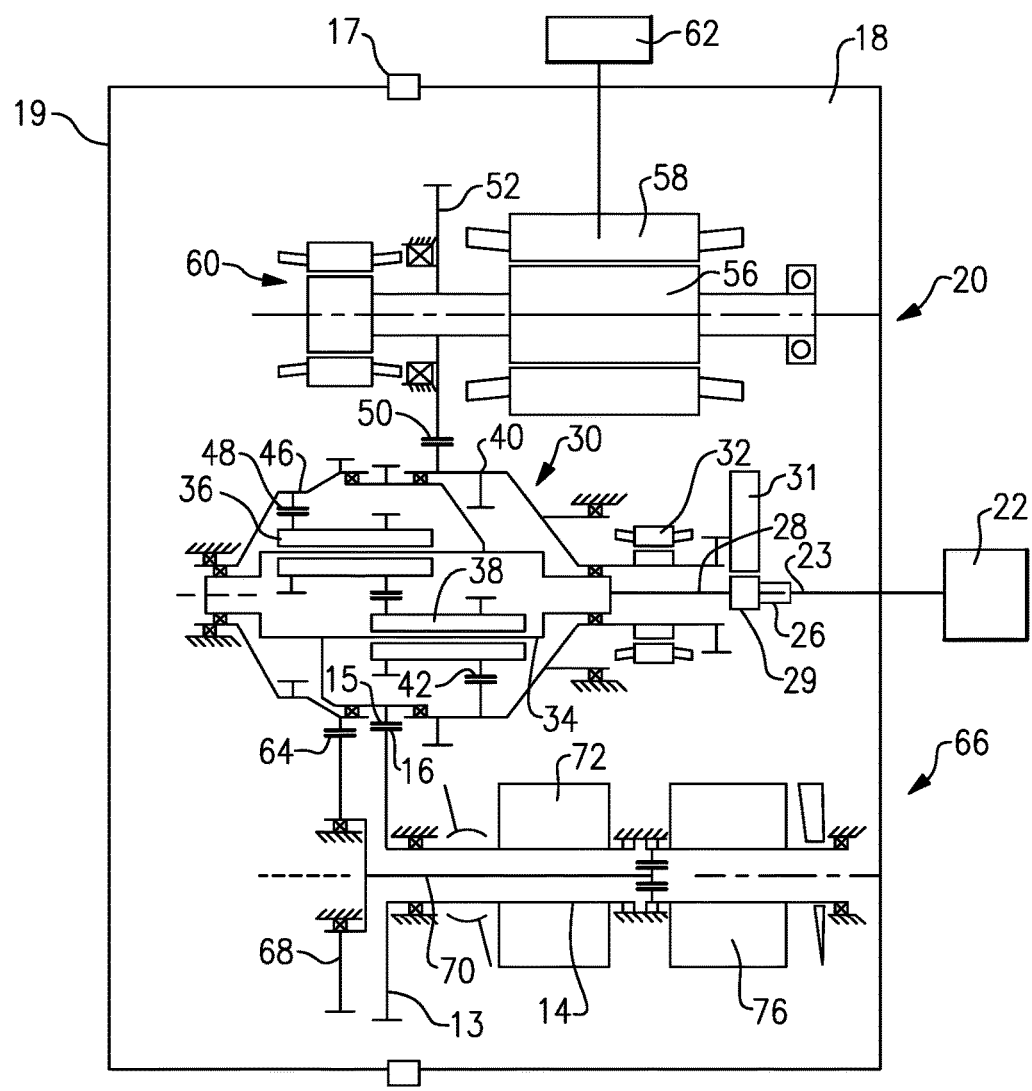
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier 34 in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and he speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the carrier shaft 28 and drives a plurality of accessory gears 31.

The operation of the integrated drive generator 20 is generally as known in the art. A worker of ordinary skill would recognize that the desired frequency and speed at use 62 would dictate a number of design functions.

FIG. 2 shows that there are a pair of hydraulic or speed trimming units 66 associated with a single ring gear 46 and a single carrier 15.

FIG. 3 shows details of the hydraulic unit 66. A speed into the gear 13 will be proportional to the speed from the input shaft 23. The gear 13 rotates with a shaft 92. The shaft 92 has a surface 95 supported on bearing 93. The shaft, through splined teeth 121, drives a cylinder block 104 to rotate.

The shaft 90 is called a fixed block shaft, although it rotates. It is called "fixed" as it is driven by the displacement half of the pump and motor assembly. The shaft 90 is supported on a bearing 132 received on a bearing race 130 on the fixed shaft 90. In addition, an inner race 134 for the bearing 132 is mounted on a housing 19. The inner race 134 includes a race surface 136.

A control 91 changes the position of a swash plate 100 based upon the input speed seen at the generator. As the cylinder block 104 rotates, pistons 102 within the cylinder block cam off a surface of the swash plate 100. As the position of the swash plate 100 is changed by control 91, the amount of hydraulic fluid driven by the pistons 102, through a port plate 106, and against piston 110 in a cylinder block 112 changes. As the pistons 110 move, they cam off a surface of fixed swash plate 108. This results in a control of a speed and direction of rotation of cylinder block 112. Cylinder block 112 has a spline connection at 121 to a shaft 94. Thus, the hydraulic unit 66 results in a desired speed and direction of rotation of the shaft 94, ultimately based upon the input speed seen at the generator. The shaft 94 drives the shaft 90 through a spline connection at 137/180 to in turn drive the gear 68. The gear 68 interacts with the trim ring gear 64 such that the ultimate speed leaving the differential 30 to the gear 52 is controlled to achieve a constant desired speed at the generator.

The cylinder blocks 104 and 112 are effectively identical. In addition, there are similar cylinder blocks 104/112 in both of the hydraulic units 66.

Figure 4A:
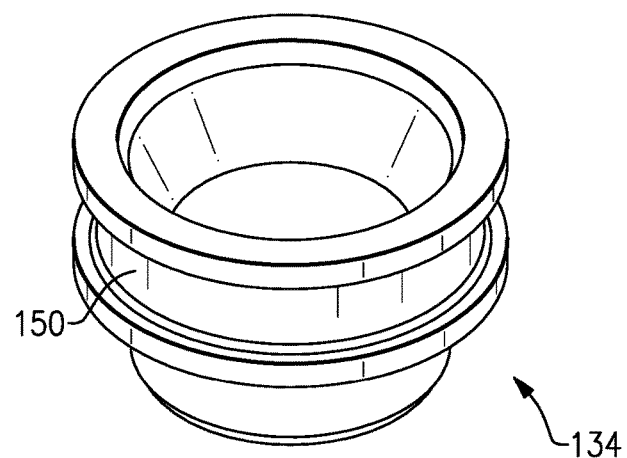
FIG. 4A shows an inner bearing support.

FIG. 4A shows the inner bearing race 134 having inner bearing race surface 150.

Figure 4B:
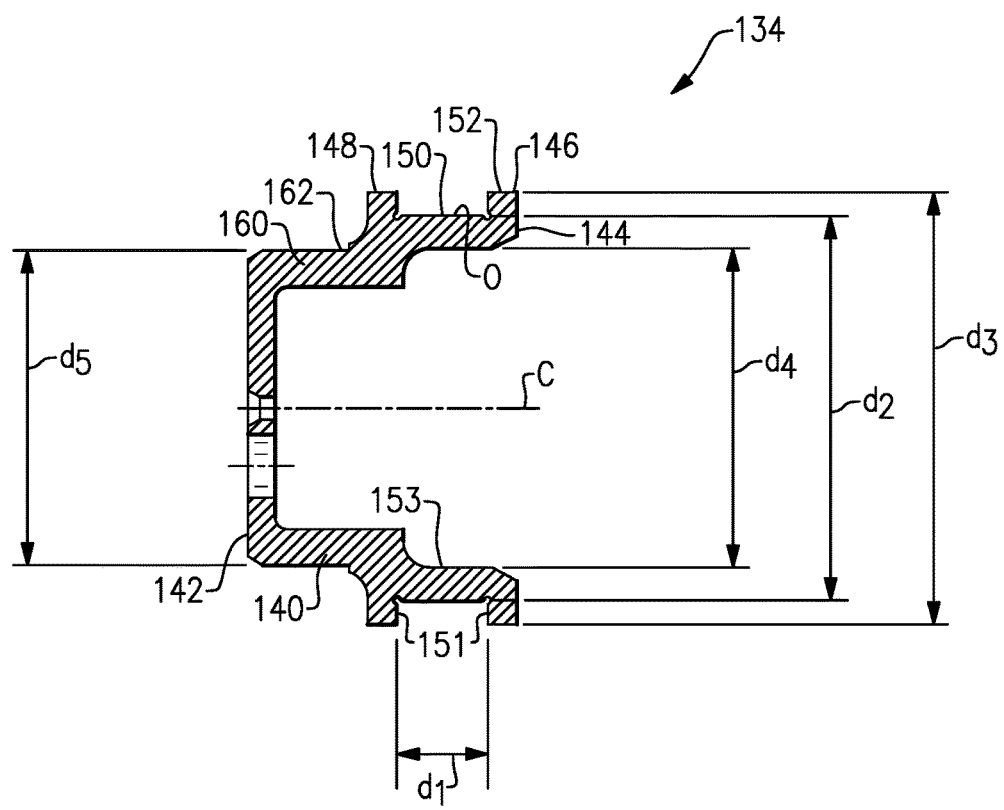
FIG. 4B is a cross-sectional view through the inner bearing support.

As shown in FIG. 4B, the inner bearing race has a body 140 extending between a first end 142 and a second end 144. A pair of lands 146 and 148 extend radially outwardly of the bearing race surface 150. The land 146 has an outer peripheral surface 152. Inner faces 151 of the lands 146 and 148 define an axial length of the bearing race $d_1$ along a central axis C. A boss 160 extends to the first end 142 from the land 148 and has an outer surface 162. A diameter of the bearing race surface 150 is defined as $d_2$. An outer diameter to an outer surface 152 of the land 146 is defined as $d_3$. An inner bore 153 is positioned inwardly of the bearing race surface 150 and has an inner diameter of $d_4$.

In an embodiment, $d_1$ was 0.316 inches (0.803 cm), $d_2$ was 1.338 inches (3.399 cm), $d_3$ was 1.496 inches (3.800 cm), $d_4$ was 1.109 inches (2.817 cm), and $d_5$ was 1.094 inches (2.779 cm). In embodiments, a ratio of $d_1$ to $d_2$ is between 0.20 and 0.30. A ratio of $d_2$ to $d_3$ is between 0.85 and 0.95. A ratio of $d_1$ to $d_4$ is between 0.25 and 0.30. A ratio of $d_1$ to $d_5$ is between 0.25 and 0.30.

A method of replacing an inner bearing race in an integrated drive generator includes the steps of removing an existing inner bearing race from an integrated drive generator having an input shaft connected to a differential. The differential is connected to a generator, and is also being connected to a hydraulic unit, which includes a variable swash plate and a fixed swash plate. Each of the swash plates are associated with a set of pistons. A fixed shaft is associated with the fixed swash plate, and connected to a cylinder block associated with the fixed swash plate. The fixed shaft includes a spline connection to drive a fixed block shaft, the fixed block shaft has gear teeth engaged to a ring gear in the differential. The fixed block shaft is supported on a bearing, and the existing inner bearing race supports the bearing. The existing inner bearing race is replaced with a replacement inner bearing race having a body extending from a first end to a second end. An inner bearing race surface is defined between a pair of lands extending radially outwardly of the inner bearing race surface, with one of the lands extending to the second end, and the bearing race surface defined by inner face surfaces of the lands, and the inner bearing race surface extending for an axial distance between the inner facing surfaces along a central axis of the body, and defining a first distance, and a second distance defined to an outer diameter of the inner bearing race surface being defined as a second distance and a ratio of the first distance to the second distance being between 0.20 and 0.30.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An inner bearing race for use in an integrated drive generator comprising:
   a body extending from a first end to a second end; and
   an inner bearing race surface defined between a pair of lands extending radially outwardly of said inner bearing race surface, with one of said lands extending to said second end, and the said bearing race surface defined by inner face surfaces of said lands, and said inner bearing race surface extending for an axial distance between said inner face surfaces along a central axis of said body, and defining a first distance, an outer diameter of said inner bearing race surface being defined as a second distance and a ratio of said first distance to said second distance being between 0.20 and 0.30.

2. The inner bearing race as set forth in claim 1, wherein a third distance is defined to an outer diameter of said land at said second end and a ratio of said second distance to said third distance is between 0.85 and 0.95.

3. The inner bearing race as set forth in claim 2, wherein an inner bore formed radially inwardly of said inner bearing race surface, and an inner diameter of said inner bore defining a fourth distance and a ratio of said first distance to said fourth distance being between 0.25 and 0.30.

4. The inner bearing race as set forth in claim 3, wherein a boss extends from a second of said lands spaced away from said second end and to said first end, and an outer diameter of said boss defining a fifth distance, and a ratio of said first distance to said fifth distance being between 0.25 and 0.30.

5. The inner bearing race as set forth in claim 1, wherein an inner bore formed radially inwardly of said inner bearing race surface, and an inner diameter of said inner bore defining a fourth distance and a ratio of said first distance to said fourth distance being between 0.25 and 0.30.

6. The inner bearing race as set forth in claim 5, wherein a boss extends from a second of said lands spaced away from said second end and to said first end, and an outer diameter of said boss defining a fifth distance, and a ratio of said first distance to said fifth distance being between 0.25 and 0.30.

7. The inner bearing race as set forth in claim 1, wherein a boss extends from a second of said lands spaced away from said second end and to said first end, and an outer diameter of said boss defining a fifth distance, and a ratio of said first distance to said fifth distance being between 0.25 and 0.30.

8. An integrated drive generator comprising:
   an input shaft connected to a differential, said differential connected to a generator, and said differential also being connected to a hydraulic unit, said hydraulic unit including a variable swash plate and a fixed swash plate, and each of said swash plates being associated with a set of pistons, and a fixed shaft associated with said fixed swash plate, and connected to a cylinder block associated with said fixed swash plate, and said fixed shaft including a spline connection to drive a fixed block shaft, said fixed block shaft having gear teeth engaged to a ring gear in said differential;

said fixed block shaft supported on a bearing, an inner bearing race supporting said bearing, said inner bearing race having a body extending from a first end to a second end; and said inner bearing race having an inner bearing race surface defined between a pair of lands extending radially outwardly of said inner bearing race surface, with one of said lands extending to said second end, and said inner bearing race surface defined by inner face surfaces of said lands, and said inner bearing race surface extending for an axial distance between said inner face surfaces along a central axis of said body, and defining a first distance, an outer diameter of said inner bearing race surface being defined as a second distance and a ratio of said first distance to said second distance being between 0.20 and 0.30.

9. The integrated drive generator as set forth in claim 8, wherein a third distance is defined to an outer diameter of said land at said second end and a ratio of said second distance to said third distance is between 0.85 and 0.95.

10. The integrated drive generator as set forth in claim 9, wherein an inner bore formed radially inwardly of said inner bearing race surface, and an inner diameter of said inner bore defining a fourth distance and a ratio of said first distance to said fourth distance being between 0.25 and 0.30.

11. The integrated drive generator as set forth in claim 10, wherein a boss extends from a second of said lands spaced away from said second end and to said first end, and an outer diameter of said boss defining a fifth distance, and a ratio of said first distance to said fifth distance being between 0.25 and 0.30.

12. The integrated drive generator as set forth in claim wherein an inner bore formed radially inwardly of said inner bearing race surface, and an inner diameter of said inner bore defining a fourth distance and a ratio of said first distance to said fourth distance being between 0.25 and 0.30.

13. The integrated drive generator as set forth in claim 12, wherein a boss extends from a second of said lands spaced away from said second end and to said first end, and an outer diameter of said boss defining a fifth distance, and a ratio of said first distance to said fifth distance being between 0.25 and 0.30.

14. The integrated drive generator as set forth in claim 8, wherein a boss extends from a second of said lands spaced away from said second end and to said first end, and an outer diameter of said boss defining a fifth distance, and a ratio of said first distance to said fifth distance being between 0.25 and 0.30.

15. A method of replacing an inner bearing race in an integrated drive generator comprising the steps of:
a) removing an existing inner bearing race from an integrated drive generator having an input shaft connected to a differential, said differential connected to a generator, and said differential also being connected to a hydraulic unit, said hydraulic unit including a variable swash plate and a fixed swash plate, and each of said swash plates being associated with a set of pistons, and a fixed shaft associated with said fixed swash plate, and connected to a cylinder block associated with said fixed swash plate, and said fixed shaft including a spline connection to drive a fixed block shaft, said fixed block shaft having gear teeth engaged to a ring gear in said differential, said fixed block shaft supported on a bearing, said existing inner bearing race supporting said bearing; and b) replacing said existing inner bearing race with a replacement inner bearing race having a body extending from a first end to a second end;

c) an inner bearing race surface defined between a pair of lands extending radially outwardly of said inner bearing race surface, with one of said lands extending to said second end, and the said bearing race surface defined by inner face surfaces of said lands, and said inner bearing race surface extending for an axial distance between said inner face surfaces along a central axis of said body, and defining a first distance, and a second distance defined to an outer diameter of said inner bearing race surface being defined as a second distance and a ratio of said first distance to said second distance being between 0.20 and 0.30.

16. The method of replacing an inner bearing race as set forth in claim 15, wherein a third distance is defined to an outer diameter of said land at said second end and a ratio of said second distance to said third distance is between 0.85 and 0.95.

17. The method of replacing an inner bearing race as set forth in claim 16, wherein an inner bore formed radially inwardly of said inner bearing race surface, and an inner diameter of said inner bore defining a fourth distance and a ratio of said first distance to said fourth distance being between 0.25 and 0.30.

18. The method of replacing an inner bearing race as set forth in claim 17, wherein a boss extends from a second of said lands spaced away from said second end and to said first end, and an outer diameter of said boss defining a fifth distance, and a ratio of said first distance to said fifth distance being between 0.25 and 0.30.

19. The method of replacing an inner bearing race as set forth in claim 15, wherein an inner bore formed radially inwardly of said inner bearing race surface, and an inner diameter of said inner bore defining a fourth distance and a ratio of said first distance to said fourth distance being between 0.25 and 0.30.

20. The method of replacing an inner bearing race as set forth in claim 19, wherein a boss extends from a second of said lands spaced away from said second end and to said first end, and an outer diameter of said boss defining a fifth distance, and a ratio of said first distance to said fifth distance being between 0.25 and 0.30.

\* \* \* \* \*